United States Patent

Arnosti et al.

[11] Patent Number: 5,494,760
[45] Date of Patent: Feb. 27, 1996

[54] OBJECT WITH AN AT LEAST PARTLY AMORPHOUS GLASS-METAL FILM

[75] Inventors: Giorgio Arnosti, Winterthur; Werner Straub, Oberstammheim; Erich Bölle, Winterthur, all of Switzerland

[73] Assignee: Gebrueder Sulzer Aktiengesellschaft, Winterthur, Switzerland

[21] Appl. No.: 958,419

[22] Filed: Oct. 9, 1992

[30] Foreign Application Priority Data

Dec. 24, 1991 [CH] Switzerland ............... 03847/91

[51] Int. Cl.⁶ ............... B32B 3/00; B32B 15/04; B32B 15/08
[52] U.S. Cl. ............... 428/614; 428/621; 428/627; 428/632; 428/687; 428/469
[58] Field of Search ............... 428/614, 687, 428/678, 627, 632, 624, 621, 661, 457, 469, 472; 148/403

[56] References Cited

U.S. PATENT DOCUMENTS

| | | | |
|---|---|---|---|
| 4,260,666 | 4/1981 | DeCristofaro et al. | 428/606 |
| 4,283,225 | 8/1981 | Sexton et al. | 428/606 |
| 4,409,296 | 10/1983 | Ward | 428/681 |
| 4,430,027 | 5/1982 | Narasimhan | 164/461 |
| 4,473,413 | 9/1984 | Nathasingh et al. | 148/31.5 |
| 4,621,031 | 11/1986 | Scruggs | 428/627 |
| 4,652,347 | 3/1987 | Kobayashi | 204/34 |
| 4,704,169 | 11/1987 | Kimura et al. | 148/403 |
| 4,710,235 | 12/1987 | Scruggs | 148/403 |
| 4,749,625 | 6/1988 | Obayashi et al. | 425/624 |
| 5,061,573 | 10/1991 | Schlapfer et al. | 428/614 |

FOREIGN PATENT DOCUMENTS

| | | |
|---|---|---|
| 3730862A1 | 3/1989 | Germany. |
| WO84/04899 | 12/1984 | WIPO. |

OTHER PUBLICATIONS

"Diamondizing Process Composite Coating", Electrocoatings News Release, Apr. 1973, 1 page.

Primary Examiner—John Zimmerman
Attorney, Agent, or Firm—Towsend and Townsend Khourie and Crew

[57] ABSTRACT

The object comprises a glass-metal film (1) with a metal matrix (2) which has solidified in an at least partly glass-like form and which may comprise hard particles (3, 3a) in the form of primary precipitates from the molten mass. The glass-metal film (1) is provided on at least one side (4) with a top layer (5) comprising a hard material which is harder than the glass-metal film (1). The top layer (5) may be formed by a base layer (7) with embedded hard material particles (8), e.g. of diamond or cubic boron nitride, or by a homogeneous hard material, e.g. diamond-like carbon. The result is a surface quality which can be separately influenced by the composition of the alloy of the glass-metal film (1). The object may be formed either as a parting tool or as a structural part with special wear and/or sliding properties.

31 Claims, 1 Drawing Sheet

OBJECT WITH AN AT LEAST PARTLY AMORPHOUS GLASS-METAL FILM

BACKGROUND OF THE INVENTION

The invention relates to an object with an at least partly amorphous glass-metal film, which comprises a metal from the iron, nickel, chromium, cobalt, vanadium group of elements, or a combination of these elements, and a metalloid from the phosphorus, carbon, boron group of elements, or of a combination of these elements, and an element from the aluminum, silicon, tin, antimony, germanium, indium, beryllium group, or a combination from these elements.

Also disclosed is a method for producing the object.

U. S. Pat. No. Re. 32,925 discloses strip- and sheet-like objects of the above-mentioned type which have at least 50% to 100% amorphous metal alloy and have particularly favorable physical properties—e.g. a high tensile strength, high flexibility and high resistance to wear and corrosion. The quality and hardness of the surface of the known objects are essentially determined by the composition of the alloy and the method by which they were produced, which should lead to a principal property satisfying the particular purpose of the object, e.g. a high flexibility, a predetermined, relatively high degree of surface hardness or a combination of these properties, to be achieved.

SUMMARY OF THE INVENTION

The invention is based on the problem of providing an improved object of the above-mentioned type which is suitable for a broader range of applications and has a surface quality which can be separately influenced by the composition of the alloy, without impairing the known properties of the glass-metal film which are determined by the composition of the alloy.

This problem is solved according to the invention in that at least one side of the glass-metal film is provided with a top layer comprising a material which is harder than the glass-metal film.

A method for producing the object according to the invention involves feeding the glass-metal film to a coating device which applies a top layer comprising a hard material to at least one side of the glass-metal film.

The top layer applied according to the invention permits the formation of a surface with a hardness which can be selected within a relatively wide range, without thereby impairing the structure of the glass-metal film, which itself may have a relatively hard, resistant surface and which is accordingly suitable as a base material for all common coating methods so that the top layer can be applied at a temperature which prevents a recrystallization of the glass-metal film.

DESCRIPTION OF THE PREFERRED EMBODIMENTS

Figure 1:
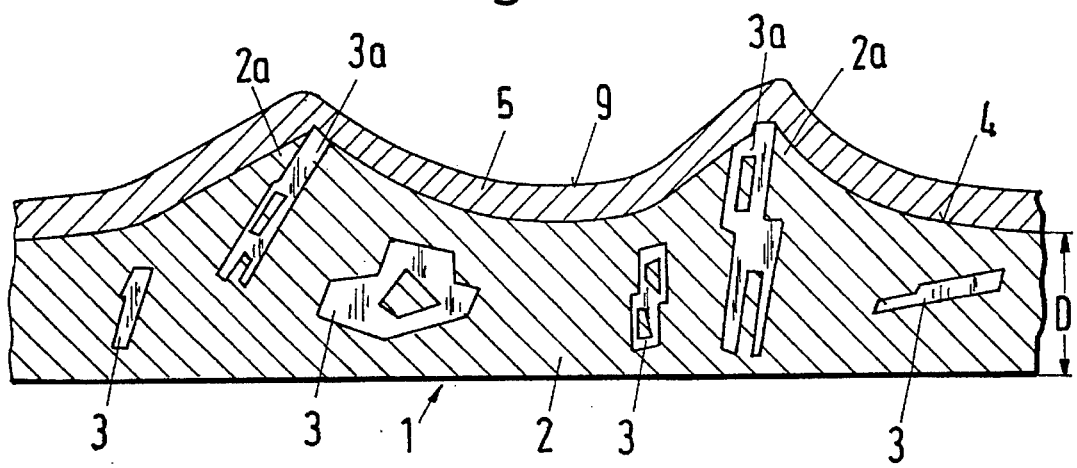
FIG. 1 is a partial cross-section of a strip formed according to the present invention in a view which corresponds to a photograph through a light optical microscope magnified 500 times.

Referring to FIG. 1, the strip comprises a glass-metal film 1 which is produced, for example, by melt spinning and has inclusions of hard particles 3 and 3a, which have solidified in the form of elongate crystals, in a glass-like metal matrix 2, which has solidified in an amorphous form in the represented example. The metal matrix 2 may in part also have a microcrystalline structure and may additionally comprise microcrystals (not shown), of hard materials. The hard particles 3 and 3a, which have solidified in irregular crystalline forms and which, as shown, may comprise internal cavities, indentations, corners and edges, are firmly embedded in an amorphous or partly microcrystalline structure of the metal matrix 2. Depending on the size and the position of the hard particles 3, 3a and the minimum thickness D of the metal matrix 2 of, for example, approximately 50 μm, the hard particles 3, having a length which, as shown, is equal to or less than the minimum thickness D, remain within the metal matrix 2. The hard particles 3a, which are longer and/or arranged closer to the free surface 4 (at the top in FIG. 1) project beyond surface 4 to a greater or lesser extent if they are set upright before the molten mass of the metal matrix 2 solidifies. The tips of the hard particles 3a are held in collar-like elevations 2a of the metal matrix 2, which increase the adhesion of the hard particles 3a in the base material and prevent them from breaking out of the metal matrix 2. A corresponding strip which has hard material particles primarily arranged close to the free surface 4 and/or so as to project beyond it, the manufacture of which is not the subject matter of this invention, is known from the EP-A-0 326 785.

As described in the EP-A-0 326 785, the hard material particles 3 and 3a in the illustrated glass-metal film 1 may be formed by metal borides, carbides or oxides, by appropriate compounds of the elements nitrogen (nitrides), fluorine (fluorides), silicon (silicides), phosphorus (phosphides), sulphur (sulphides) or chlorine (chlorides) and by intermetallic compounds, plastic particles or combinations of these parts. In the illustrated embodiment the hard particles 3, 3a are formed by chromium boride crystals, and the surface 4 of the metal matrix 2 may have a peak-to-valley value which can be predetermined within a relatively large range and which may, for example, be up to 250 μm.

As can also be seen from FIG. 1, the glass-metal film 1 is provided with an essentially homogeneous top layer 5 of a hard material which, in the illustrated example, consists essentially of diamond-like carbon. This layer is applied to the surface 4 and the tips of the hard material particles 3a. The top layer 5 may be applied in a coating device, which is not shown, by a known coating method, for example by chemical or physical deposition means from the gaseous phase (chemical vapor deposition=CVD method or physical vapor deposition=PVD method), plasma assisted vapor deposition or thermal spraying, e.g. plasma spraying, onto glass-metal film 1. It can have a high tensile strength and flexibility, which, because its surface 4 can be of a predetermined hardness and roughness, is suitable as a substrate for all coating methods which can be used in this connection, and which ensures that the top layer 5 adheres well.

The roughness of the surface 4 of the metal matrix 2 may be influenced by controlling the production parameters, for example according to the method described in the EP-A-0 326 785. As shown in FIG. 1, the glass-metal film 1 has a relatively rough surface 4. The application of the top layer 5 to this surface 4 thus results in a parting tool (grinding tool)

with a correspondingly rough surface 6 and diamond-like hardness. By varying the production parameters, e.g. the temperature when producing the glass-metal film 1, the surface 4 and thus the surface 6 can be given appropriately smaller peak-to-valley values which can be graduated as desired, with the possibility of also obtaining an approximately smooth surface 4, which is not shown, and thus using the glass-metal film 1 provided with the top layer 5 as a structural part with a relatively smooth surface 6 having an appropriately high resistance to wear and/or appropriately favorable sliding properties. The top layer 5 may also be formed from a different hard material consisting essentially of a compound of at least one of the elements boron, carbon, nitrogen, oxygen, silicon or phosphorus with a metal, e.g. titanium nitride, chromium carbide.

Figure 2:
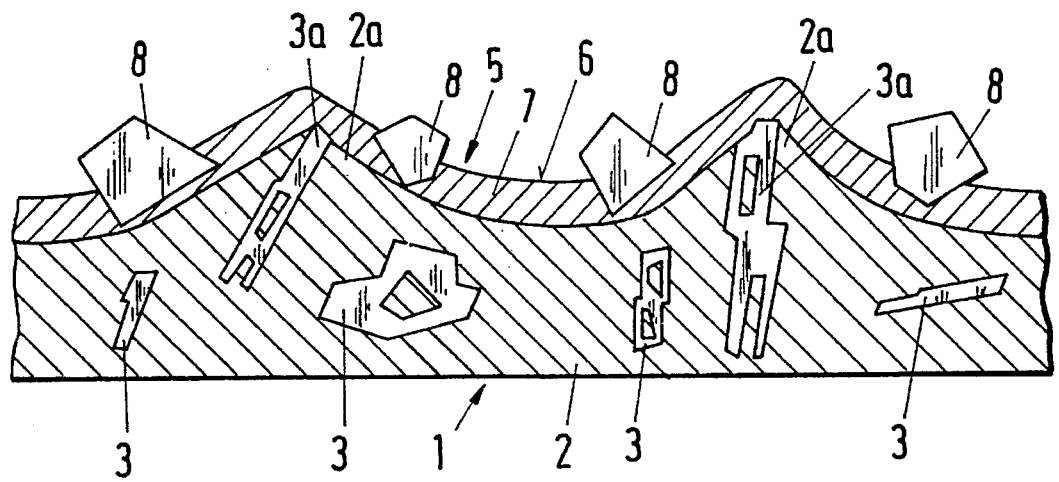
FIGS. 2 and 3 are corresponding partial cross-sectional views of further strips, in each case in a different embodiment.

As shown in FIG. 2, the top layer 5 may also be formed by a heterogeneous layer of a base material with embedded particles 8 of a hard material which may also consist essentially of a compound of at least one of the elements boron, carbon, nitrogen, oxygen, silicon or phosphorus, e.g. of diamond or cubic boron nitride. The base material is disposed in a base layer 7, which is joined to the glass-metal film 1 and which consists essentially of at least one metal, which can be applied electrolytically (galvanically) to the glass-metal film 1, from the silver, aluminum, cadmium, chromium, cobalt, copper, nickel, lead, tin, zinc group or an appropriate compound, e.g. nickel phosphide. In the illustrated arrangement the base layer 7 may consist of nickel.

An appropriate base layer 7 consisting, for example, of copper, nickel or a combination of these metals may also be applied without current. According to another embodiment, the base layer 7 consisting, for example, of aluminum, zinc, tin, lead or a combination of these metals can be applied to the glass-metal film 1 by a hot dip galvanizing method. According to a further embodiment, the base layer 7 consisting, for example, of cadmium, zinc or a combination of these metals can be applied to the glass-metal film 1 by chemical/mechanical deposition. According to yet another embodiment, the base layer 7 may consist of a base material which can be applied to the glass-metal film 1 by a spraying method, in particular thermal spraying. A plastic, e.g. polyester, or a ceramic material, e.g. aluminum oxide, may also be used as the base material.

The particles 8 which are held in the base layer 7 and which in the illustrated arrangement consist, for example, of diamond, may project beyond the hard material particles 3a of the glass-metal film 1 and form with the corresponding remaining particles 8 of the top layer 5 a working surface of a grinding tool of the utmost hardness or, as indicated. in FIG. 2, form with the tips of the hard particles 3a of the glass-metal film 1 a corresponding working surface which, for example, reinforces the abrasive action provided by the hard material particles 3a of the glass-metal film 1. In the example according to FIG. 2 this occurs once the base material—the nickel of the base layer 7—no longer covers the tips of the hard particles 3a.

Figure 3:
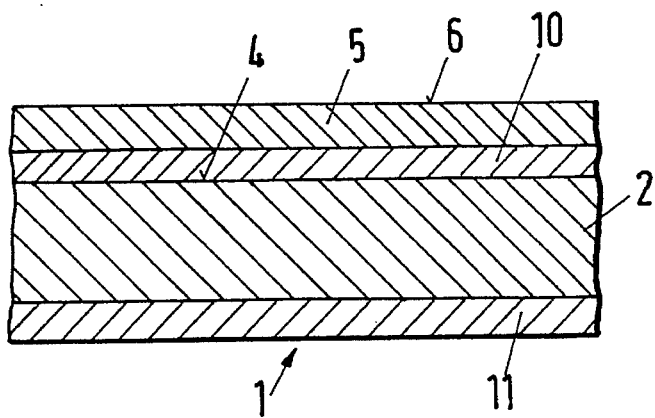

Referring to FIG. 3, the metal matrix 2, which has no hard material particles, of the glass-metal film has an essentially smooth free surface 4, on which an intermediate layer 10 is disposed. It can be applied electrolytically, without current, by hot dip galvanizing, chemical/mechanical deposition or a spraying method and which consists of a material is different from, e.g. softer than, that of the glass-metal film 1 and the top layer 5. The top layer 5 is applied to the intermediate layer 10 in the same way as it is secured to the glass-metal film 1—electrolytically (galvanically), without current, by hot dip galvanizing, chemical/mechanical deposition or by one of the above-mentioned CVD, PVD or spraying methods.

As illustrated, a compensating layer 11, which corresponds to the intermediate layer 10, can be applied in a like manner and preferably consists of the same material, may be applied to the underside of the glass-metal film 1 which is opposite the free surface 4, and prevents, for example, the glass-metal film 1 from becoming deformed on one side. The top layer 5 may be formed by a base layer 7 with hard particles 8 or, as shown in FIG. 3, by a homogeneous hard material layer, e.g. of diamond-like carbon, while the intermediate layer 10 and the compensating layer 11 consist, for example, of copper. An intermediate layer 10 of this kind may be provided to neutralize the effects of different degrees of thermal expansion between the glass-metal film 1 and the top layer 5 or to improve the adhesion of the top layer 5 to the glass-metal film or enable this adhesion to be achieved. A corresponding intermediate layer 10, which is disposed between the glass-metal film 1 and the top layer 5 or the carrier layer 7, and/or a corresponding compensating layer 11 may of course also be provided in arrangements corresponding to FIGS. 1 and 2. Also possible are arrangements in which both sides of the glass-metal film 1 are provided with a corresponding top layer 5.

In the arrangement according to FIG. 3 the top layer 5 forms a wear-resistant sliding surface.

The strip formed according to the invention may have a tensile strength which is three to four times greater than that of conventional structural steel and a long-term resistance to temperatures of between approximately 200° C. and 300° C. By means of capacitor discharge welding, for example, this strip can be made into a continuous strip which is particularly adapted for use as a flexible parting tool, e.g. for grinding, cutting, honing, etc. Disc-like parting elements may also be made, e.g. punched, out of the strip and used as flexible grinding elements or they may be applied, e.g. bonded, to a base and used as rigid parting elements (grinding elements) or, like a cut-off wheel, as a cutting member.

What is claimed is:

1. Object comprising an at least partly amorphous continuous strip of a glass-metal film having a free surface and made of a metal selected from the group consisting of iron, nickel, chromium, cobalt, vanadium and a combination thereof, a metalloid selected from the group consisting of phosphorus, carbon, boron and a combination thereof, and a material selected from the group consisting of aluminum, silicon, tin, antimony, germanium, indium, beryllium and a combination thereof, and a top layer separately applied to and covering the free surface of the glass-metal film strip and comprising a material other than the material of the glass-metal film strip, the material of the top layer including a hard material which is harder than the glass-metal film.

2. Object according to claim 1, wherein the glass-metal film strip comprises inclusions of hard particles formed by primary precipitates from the glass-metal film, disposed proximate to the free surface of the glass-metal film strip and projecting beyond the free surface.

3. Object according to claim 1, including an intermediate layer between the glass-metal film strip and the top layer and comprising a material which is different from the material of the glass-metal film strip and the material of the top layer.

4. Object according to claim 1 wherein the top layer comprises particles of a hard material which is a compound selected from the group consisting of at least one of boron, carbon, nitrogen, oxygen, silicon and phosphorus.

5. Object according to claim 4 wherein the compound comprises diamond.

6. Object according to claim 4 wherein the compound comprises cubic boron nitride.

7. Object according to claim 4 wherein the top layer comprises a base layer joined to the glass-metal film strip having hard material particles embedded therein.

8. Object according to claim 7 including an intermediate layer disposed between the glass-metal film strip and the base layer.

9. Object according to claim 7 wherein the base layer consists essentially of at least one metal selected from the group consisting of silver, aluminum, cadmium, chromium, cobalt, copper, nickel, lead, tin and zinc and electrolytically applied to the glass-metal film strip.

10. Object according to claim 9 including an intermediate layer between the base layer and the glass-metal film strip.

11. Object according to claim 9 wherein the base layer comprises a compound made of a metal selected from the group consisting of silver, aluminum, cadmium, chromium, cobalt, copper, nickel, lead, tin and zinc.

12. Object according to claim 7 wherein the base layer consists essentially of at least one metal selected from the group consisting of aluminum, zinc, tin, lead and a combination thereof and applied to the glass-metal film strip by hot dip galvanizing.

13. Object according to claim 12 including an intermediate layer disposed between the base layer and the glass-metal film strip.

14. Object according to claim 7 wherein the base layer consists essentially of at least one metal selected from the group consisting of copper, nickel and a combination thereof and applied to the glass-metal film strip without current.

15. Object according to claim 14 including an intermediate layer disposed between the base layer and the glass-metal film strip.

16. Object according to claim 7 wherein the base layer consists essentially of at least one metal selected from the group consisting of cadmium, zinc and a combination thereof and applied to the glass-metal film strip by a mechanical deposition process.

17. Object according to claim 16 including an intermediate layer disposed between the base layer and the glass-metal film strip.

18. Object according to claim 16 wherein the at least one metal is applied to the glass-metal film strip by a chemical deposition process.

19. Object according to claim 18 including an intermediate layer between the base layer and the glass-metal film strip.

20. Object according to claim 7 wherein the base layer comprises a base material applied to the glass-metal film strip by a spraying method.

21. Object according to claim 20 wherein the spraying method comprises a thermal spraying method.

22. Object according to claim 20 wherein the base material is a plastic.

23. Object according to claim 22 wherein the plastic comprises polyester.

24. Object according to claim 20 wherein the base material is a ceramic material.

25. Object according to claim 24 wherein the ceramic material comprises aluminum oxide.

26. Object according to claim 1 wherein the top layer comprises a homogeneous layer of a hard material.

27. Object according to claim 26 wherein the hard material consists essentially of a material applied to the glass-metal film strip by one of a chemical deposition process and a physical deposition process and at least one further material selected from the group consisting of boron, carbon, nitrogen, oxygen, silicon and phosphorus.

28. Object according to claim 27 including an intermediate layer between the top layer and the glass-metal film strip.

29. Object according to claim 27 wherein the deposition process comprises plasma spraying.

30. An object comprising an at least partly amorphous glass-metal film made of a metal selected from the group consisting of iron, nickel, chromium, cobalt, vanadium and a combination thereof, a metalloid selected from the group consisting of phosphorus, carbon, boron and a combination thereof, and a material selected from the group consisting of aluminum, silicon, tin, antimony, germanium, indium, beryllium and a combination thereof, the film having inclusions of hard particles formed by primary precipitates from the glass-metal film, at least some of the hard particles having portions projecting beyond a surface of the glass-metal film, a base layer joined to the free surface of the glass-metal film and covering the projecting portions to form base layer protuberances where it covers the projecting portions, and additional hard particles embedded in and partially protruding beyond the base layer, whereby upon a removal of the base layer protuberances the projecting portions of the additional hard particles and the projecting portions together define an abrasive working surface of the object.

31. An object according to claim 30 wherein the base layer protuberances extend further away from the glass-metal film surface than the additional hard particles.

* * * * *